Oct. 18, 1932.   H. T. WOODWARD   1,883,261
PROCESS OF RECOVERING GLASERITE
Filed Jan. 14, 1929
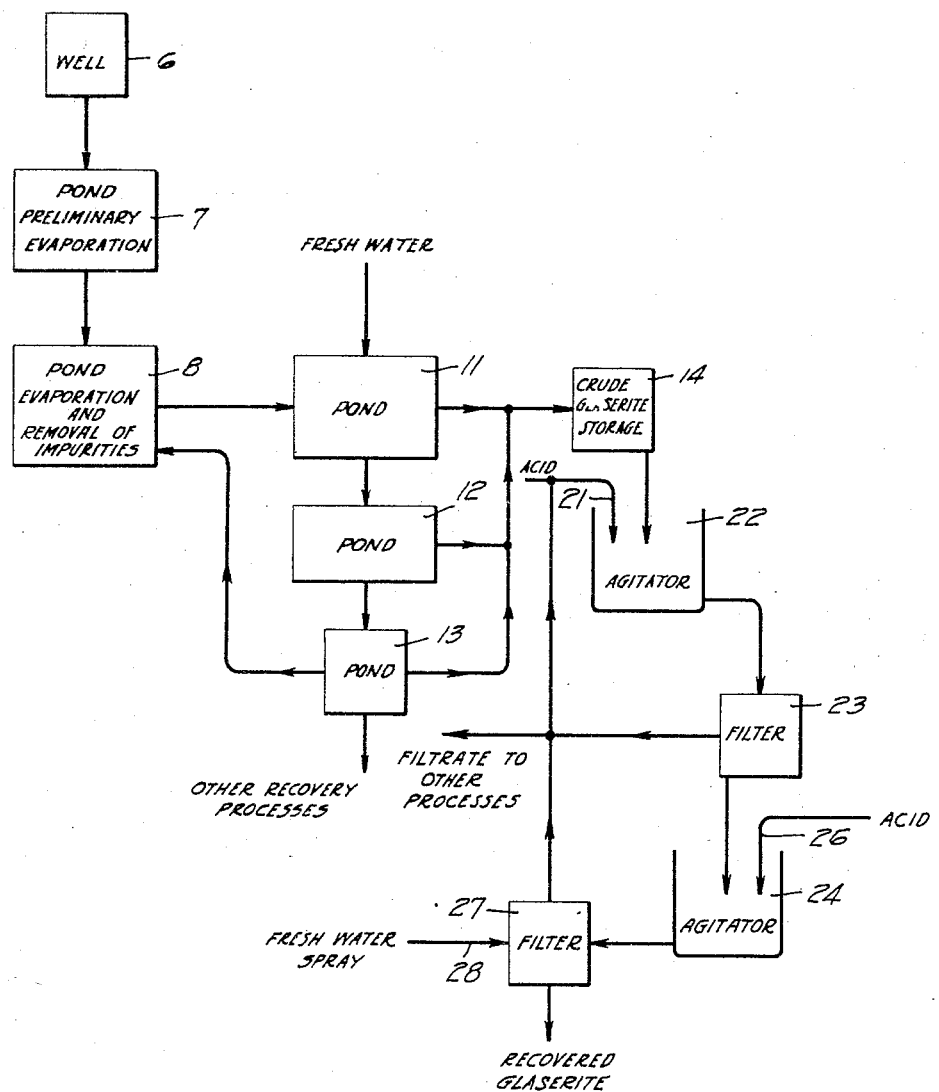
INVENTOR
Henry Teynham Woodward
BY
White, Prost & Fryer
ATTORNEYS Patented Oct. 18, 1932

1,883,261

UNITED STATES PATENT OFFICE

HENRY TEYNHAM WOODWARD, OF BERKELEY, CALIFORNIA, ASSIGNOR TO BURNHAM CHEMICAL COMPANY, OF RENO, NEVADA, A CORPORATION OF NEVADA

PROCESS OF RECOVERING GLASERITE

Application filed January 14, 1929. Serial No. 332,463.

My invention relates to an improved method of obtaining the complex crystalline salt, potassium sodium sulphate, $K_3Na(SO_4)_2$, sometimes called glaserite, from brines such as the complex subterranean brine found at Searles Lake, California.

It is an object of my invention to facilitate the procuring of the potassium sodium sulphate in a pure condition.

Another object of my invention is to increase the yield of potassium sodium sulphate obtained from a Searles Lake brine.

Another object of my invention is to purify a salt containing other salts as impurities.

A further object of my invention is to decrease the quantity of impurities retained in the recovered potassium sodium sulphate.

A further object of my invention is to procure salts present as impurities in another salt in a more desirable form.

My invention possesses other advantageous features, some of which, with the foregoing will be set forth in the following description where I shall outline in full the preferred process of my invention and those forms of the apparatus for carrying out the process, which I have selected for illustration in the drawing accompanying and forming part of the present specification. Although my process is outlined as practiced with a Searles Lake brine it is to be understood that it is not limited to this particular brine. In the drawing:

The figure is a diagrammatic flow sheet of a process embodying a form of my invention.

In the drawing I have indicated a process for the recovery of the glaserite or potassium sodium sulphate from a complex brine such as that found in Searles Lake. The brine is drawn from a well 6 and pumped to a pond 7 where it is subjected to a preliminary evaporation and concentration. Although any of the usual concentrating methods are applicable I preferably make use of the natural conditions existing in the Searles Lake region and effect the concentration by means of solar evaporation. When it is desired, transference of the brine into the shallow pond 8 for further concentration is effected. Here, certain of the undesirable salts precipitate as the solution becomes concentrated to the point of super saturation. When the degree of concentration desired has been reached the brine is pumped into a pond 11 where the glaserite precipitates from the super saturated solution. Fresh water may be added to decrease the concentration of the other salts present and thus present their precipitation along with the potassium sodium sulphate. After a portion of the glaserite has precipitated, the brine is passed on to the next pond 12 where further concentration of the brine and precipitation of the glaserite occur. This process is again repeated in the final pond 13 from which the brine, now substantially free of the potassium sodium sulphate, is drawn out to be further processed for other salts or returned to the pond 8 for further concentration. The precipitated glaserite is collected and stored in bins 14.

I may also utilize the process and apparatus described in the copending application of George B. Burnham entitled, "Process of and apparatus for obtaining potassium sodium sulphate", Serial No. 69,271, filed November 16, 1925, for recovering the glaserite.

The recovered potassium sodium sulphate is precipitated in the presence of high concentration of various other salts and consequently is not in a pure state. As an example, a batch or glaserite recovered during the summer months was found to have present impurities in approximately the following percentages:

| | Per cent |
|---|---|
| $Na_2B_4O_7$ | 1.6 |
| $NaCl$ | 10.2 |
| $Na_2CO_3.2Na_2SO_4$ | 17.3 |

During the fall the complex salt, $Na_2CO_3.2Na_2SO_4$, known as Burkeite, does not usually appear and the percentage of impurities are approximately the following:

| | Per cent |
|---|---|
| $Na_2CO_3$ | 4 |
| $Na_2B_4O_7$ | 5–10 |
| $NaCl$ | 20 |

Since one of the principal uses of potassium sodium sulphate is for fertilizer, it is readily discerned that the presence of the impurities is objectionable. Attempts to purify the glaserite by washing have generally proved failures for while sodium chloride, which is more soluble than the glaserite, may be readily washed out, the other salts are less soluble and washing removes more glaserite than impurities. Borax is particularly difficult to remove, and Burkeite, although it is fairly soluble at low temperatures, has such a low time rate of solution that washing is impractical.

Likewise efforts to purify the glaserite by recrystallization have not met with success for the solubilities of the several salts present as impurities are less than that of the glaserite under ordinary conditions. Consequently such efforts resulted in the precipitation of glaserite with various quantities of the other salts present as impurities as has been indicated above.

I have found that it is expedient, depending upon the particular salts present as impurities, to convert the salts present which are less soluble than the potassium sodium sulphate to a more soluble form. With impurities present as sodium carbonate, sodium chloride, borax and Burkeite, I have added to the crude glaserite dilute sulphuric acid in sufficient quantities to convert substantially all the sodium carbonate, present as such or as combined in the difficulty soluble Burkeite, to sodium sulphate and to convert substantially half the borax present to boric acid.

The carbon dioxide formed is preferably liberated from the solution although it may be substantially retained if desired. The resulting sodium sulphate is more soluble than the glaserite and consequently may be readily washed out. Furthermore the sodium sulphate depresses the solubility of the glaserite more than it depresses the solubility of borax or sodium chloride so that a correspondingly greater yield is obtained than heretofore possible.

Borax is more soluble in a dilute acid solution than in water. The maximum solubility is reached when enough acid has been added to convert half the borax present to boric acid. The pH of the solution is then about 8.5; that is the concentration of the hydrogen ion in the solution is minus $10^{8.5}$ grams per liter. The separation of the relatively less soluble potassium sodium sulphate from the borax is then readily effected.

While the quantity of acid added to the crude salt depends upon the character and quantity of the impurities present I have found that about five per cent by volume of the usual 93% commercial acid will suffice. however, the exact quantity of acid to be added is easily determined by calculation based upon the nature and the percentages of the several impurities present.

While I have specifically mentioned the use of sulphuric acid I may use, with a certain degree of success, other acids as well. Among them I may mention a few mineral acids as sulphurous, hydrochloric, nitric, boric and carbonic acid, and a few organic acids as acetic, the chloracetic acids, oxalic, and the benzinesulphonic acids. The criterion of the acid to be used is that the water solubility of the salts, considered as impurities, should be increased by the addition of the acid, either because of the alteration of the salt, or because of the more favorable ionic character of the solution, as in the case of borax. The acids may be used in varying concentrations depending upon their strength and the quantity of liquid necessary to give a workable mass in the agitators.

To carry out the process, as I have outlined it in my preferred form, I prefer to draw the impure glaserite crystals from the storage bins 14 and, mixing them with the required quantity of dilute sulphuric acid sprayed from the nozzle 21, agitate them in the agitator 22. I have found, with a certain crude glaserite and under certain conditions, that six hours agitation is a sufficient length of time for contacting of the acid and crystals. This time may be more or less depending upon operating conditions. The process may be operated as a batch process but I prefer to operate continuously, drawing off from the bottom of the agitator a quantity sufficient to insure that the necessary time of agitation has elapsed. The acid solution-crystal mixture drawn off passes to a filter 23 where the crystals and liquid are separated.

If the potassium sodium sulphate is not sufficiently purified I repeat the process in an agitator 24, to which a quantity of dilute sulphuric acid is supplied from a nozzle 26. After agitation for the requisite period of time the acid solution-crystal mixture is passed continuously to a filter 27 where the crystals are separated from the solution. The purified potassium sodium sulphate or glaserite crystals, after washing with water from a spray 28, are collected ready for use. The filtrate from the filters 23 and 27 may be returned to the agitator 22 to be used again in treating the glaserite or drawn off to be used elsewhere.

In some instances, where the concentration of the undesirable salts, particularly sodium chloride, is high I preferably wash the crude glaserite with a quantity of water before adding the acid or acidulated wash water. This reduces substantially the quantity of acid required to wash the crude salt. I have observed that impurities such as sodium chloride are readily washed out of the glaserite.

I claim:

1. The method of recovering glaserite from Searles Lake brine comprising recovering said brine, concentrating said brine, recovering crude glaserite from said concentrated brine, treating said crude glaserite with dilute sulphuric acid, and recovering said treated glaserite.

2. The method of recovering glaserite from Searles Lake brine comprising recovering said brine, concentrating said brine, recovering crude glaserite from said brine, agitating said crude glaserite with dilute sulphuric acid, filtering said treated glaserite, recovering said filtered glaserite, and recovering the filtrate.

3. The method of purifying crude glaserite comprising treating said crude glaserite with dilute sulphuric acid and recovering said treated glaserite.

4. The method of recovering crude glaserite from other salts comprising increasing the solubility of the other salts by conversion to forms of a more soluble salt, and recovering said glaserite.

5. The method of separating glaserite from salts considered to be impurities comprising converting said impurities substantially into other salts of greater solubility, and recovering substantially said glaserite.

6. The method of separating a desired salt from other salts considered to be impurities comprising substantially converting said other salts to more soluble salts by the addition of the acid of the more soluble salt, and recovering said desired salt.

7. The method of recovering the salt, potassium sodium sulphate, from other salts considered to be impurities comprising substantially converting said impurities to more soluble forms, substantially depressing the solubility of said potassium sodium sulphate, and recovering said potassium sodium sulphate from said converted impurities.

8. The method of purifying crude potassium sodium sulphate comprising treating said crude potassium sodium sulphate with a predetermined quantity of an acid sufficient to convert substantially all the carbonates present to carbonic acid.

9. In the purification of crude potassium sodium sulphate that step which comprises treating said crude potassium sodium sulphate with a dilute sulphuric acid.

10. In the purification of crude potassium sodium sulphate containing as an impurity the salt, Burkeite, the step comprising treating said potassium sodium sulphate with an acid substantially to convert said Burkeite to a salt more soluble than said potassium sodium sulphate.

11. In the purification of crude potassium sodium sulphate containing sodium carbonate as an impurity that step comprising treating said sodium carbonate with an acid to convert said sodium carbonate to a salt of said acid, said salt being more soluble than said potassium sodium sulphate.

12. The method of purifying a salt containing borax as an impurity comprising decreasing the pH value of the solution containing said salt and borax to render said borax more soluble.

13. The method of purifying potassium sodium sulphate containing carbonates and borates as impurities comprising substantially converting said carbonates into salts of a greater solubility and substantially increasing the solubility of the borate by decreasing the pH value of the solution.

14. The method of purifying glaserite comprising washing impurities as sodium chloride out of the glaserite, and then treating the glaserite with dilute sulphuric acid to render other impurities more soluble than the glaserite whereby the glaserite is recovered substantially free of impurities.

15. The method of purifying glaserite consisting in washing impurities as sodium chloride out of the glaserite, and then treating the glaserite with an acid to convert other impurities to salts more soluble than the glaserite whereby the glaserite is recovered substantially free of impurities.

In testimony whereof, I have hereunto set my hand.

HENRY TEYNHAM WOODWARD.